United States Patent [19]

Giacoppo

[11] 4,087,648
[45] May 2, 1978

[54] MODULAR CONNECTOR FOR SWITCHING FRAME

[75] Inventor: Guglielmo Giacoppo, Milan, Italy

[73] Assignee: Societa Italiana Telecomunicazioni SIEMENS S.p.A., Milan, Italy

[21] Appl. No.: 751,890

[22] Filed: Dec. 17, 1976

[30] Foreign Application Priority Data

Dec. 19, 1975  Italy .................. 30491 A/75

[51] Int. Cl.² ................................ H04Q 1/02
[52] U.S. Cl. ........................ 179/98; 361/399
[58] Field of Search ............... 179/91 R, 98, 1 PC;
361/342, 346, 352, 355, 397, 399, 404, 409, 410,
392, 395; 339/18 R, 18 B, 18 C, 18 P, 19, 198 R,
198 S

[56] References Cited

U.S. PATENT DOCUMENTS

| | | | |
|---|---|---|---|
| 3,324,353 | 6/1967 | Retzlaff et al. | 361/410 |
| 3,462,558 | 8/1969 | Selz | 179/98 |
| 3,755,630 | 8/1973 | Boyer | 179/98 |
| 3,970,802 | 7/1976 | Nijman | 179/98 |
| 4,017,768 | 4/1977 | Valfre | 361/399 |
| 4,017,770 | 4/1977 | Valfre | 339/421 |

OTHER PUBLICATIONS

Telecomunicazioni (Italy), "Mechanical Structure of Telephone Multiplex MTN2", L. Antola, F. Bebber, G. Giacoppo, No. 47, Jun. 1973, pp. 117–126.

*Primary Examiner*—Kathleen H. Claffy
*Assistant Examiner*—Randall P. Myers
*Attorney, Agent, or Firm*—Karl F. Ross

[57] ABSTRACT

A modular connector, to be assembled with other such connectors into a switching frame designed to interlink incoming and outgoing lines of a telecommunication system, comprises a flat prismatic housing of generally rectangular outline with a bank of input terminals and a bank of output terminals fitted into a pair of recesses on its opposite longitudinal edges. Leads extending from the two terminal banks within the housing are bent to emerge at a major housing surface overlain by a printed-circuit board whose conductor strips connect them with two further sets of leads emerging from the same major surface adjacent one of its transverse edges, the leads of these letter sets extending into a junction box attached to the housing along that transverse edge. Within the junction box, normally closed by a hinged door, contacts tied to the two sets of leads can be selectively interconnected or, if desired, extended to testing equipment.

14 Claims, 7 Drawing Figures

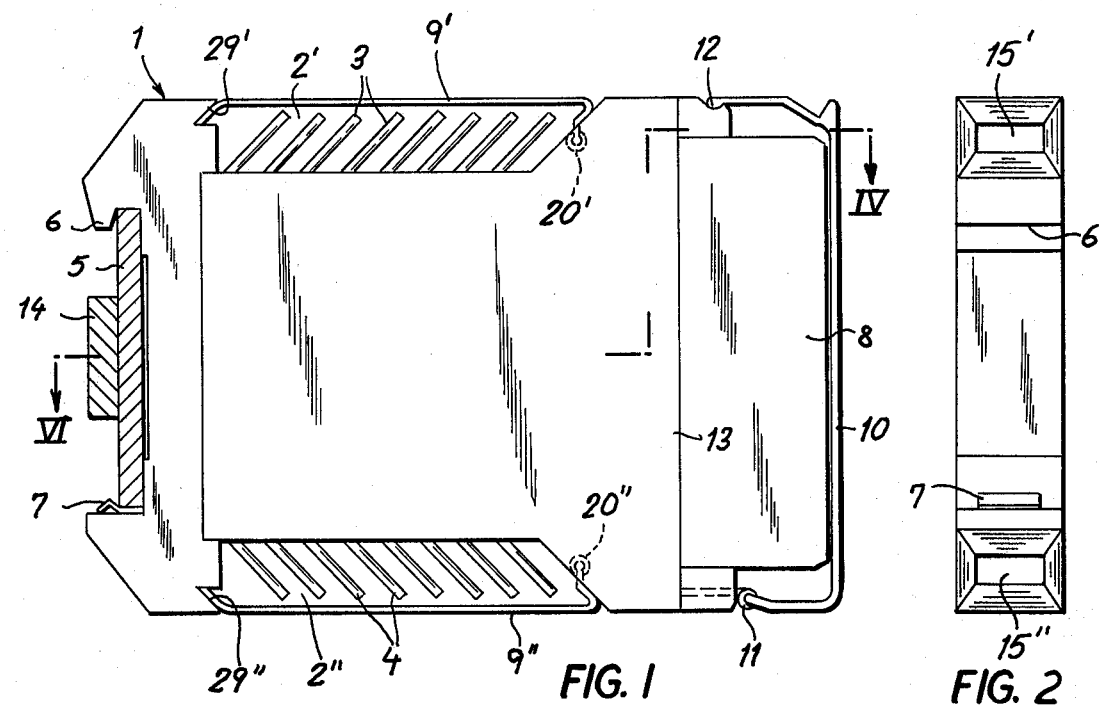
FIG. 1
FIG. 2
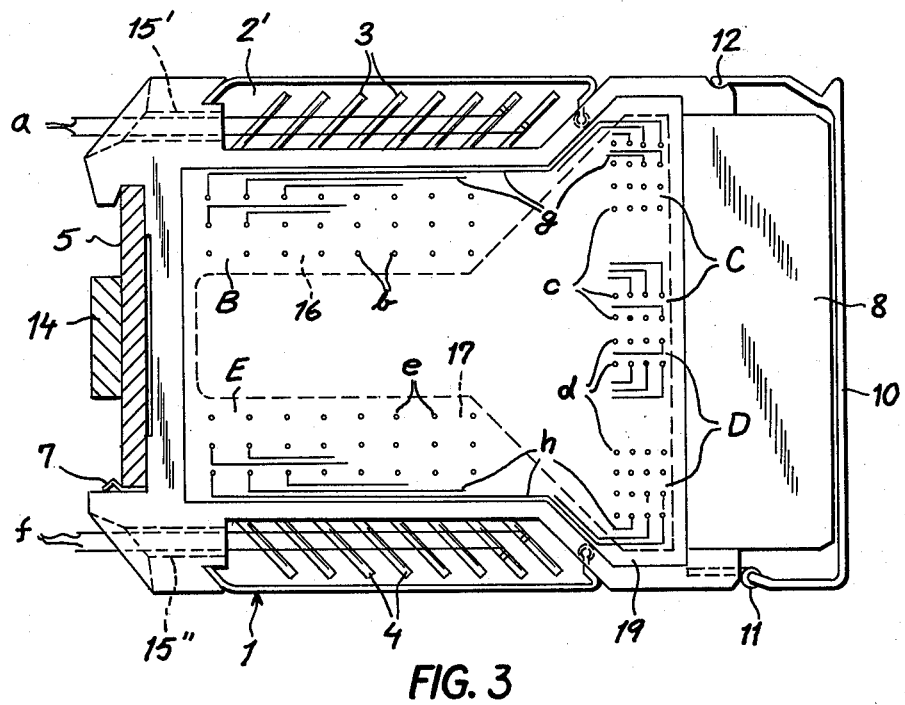
FIG. 3

MODULAR CONNECTOR FOR SWITCHING FRAME

FIELD OF THE INVENTION

My present invention relates to a switching frame, designed for selectively interlinking incoming and outgoing transmission lines of a telecommunicating system, and more particularly to a modular connector constituting one of several identical units to be assembled in such a frame.

BACKGROUND OF THE INVENTION

Switching frames of the type here envisaged may be used to establish semipermanent connections between a number of incoming lines and a like number of outgoing lines of a central office; the term "lines", as here used, includes both local circuits and signal paths leading to remote stations. In some instances, as with a private branch exchange (PBX) or switchboard, the number of outgoing lines may differ from the number of incoming lines.

In all these cases it is necessary for an operator to have ready access to line terminations, such as jacks or plugs, between which a connection is to be made or broken; such access is also desirable for the purpose of connecting testing equipment to an incoming or outgoing line.

Conventional modular units of this description, which must be bolted to one another and to a supporting frame member, are inconvenient to readjust since their accessibility is limited and the process of disassembling and reassembling is time-consuming.

OBJECT OF THE INVENTION

The object of my invention is to provide an improved modular unit for the purpose set forth which avoids these inconveniences.

SUMMARY OF THE INVENTION

In accordance with the present invention, I provide a generally prismatic connector housing preferably of generally rectangular outline, this housing having two major surfaces interconnected by at least three minor surfaces. A bank of input terminals on a first minor surface and a bank of output terminals on a preferably opposite second minor surface are respectively tied to incoming and outgoing lines which are to be selectively interlinked. A first and a second set of leads extend within the housing from the input and output terminals, respectively, and emerge in a first and a second zone at one of these major surfaces. A third and a fourth set of leads extend within the housing from third and fourth zones of the same major surface to a third minor housing surface where the terminations of these leads can be selectively interconnected by suitable linking elements or jumpers. The first and third sets of leads as well as the second and fourth sets of leads are connected to one another by conductor means preferably incorporated in a printed-circuit board forming part of the major housing surface from which these leads emerge.

Though the zones referred to need not be physically separated and may even be interlaced, it will be advantageous to provide separate compartments for the first and second sets of leads respectively assigned to the input terminals and the output terminals. In order to realize a particularly compact structure, I prefer to accommodate the two banks of terminals in respective recesses formed along the larger sides of a generally rectangular housing perimeter. This allows the associated incoming and outgoing lines to be led in by way of substantially longitudinally extending passages from the smaller side opposite the aforementioned third minor surface carrying the terminations of the third and fourth sets of leads.

According to a further feature of my invention, this third minor surface adjoins a junction box into which the lead terminations extend and which is preferably removably attached to the connector housing.

BRIEF DESCRIPTION OF THE DRAWING

The above and other features of my invention will now be described in detail with reference to the accompanying drawing in which:

FIG. 1 is a side-elevational view of a modular connector according to my invention;

FIG. 2 is an end view of the connector shown in FIG. 1;

FIG. 3 is a view similar to FIG. 1 but with removal of a protective cover to expose an underlying printed-circuit board;

SPECIFIC DESCRIPTION

Figure 4:
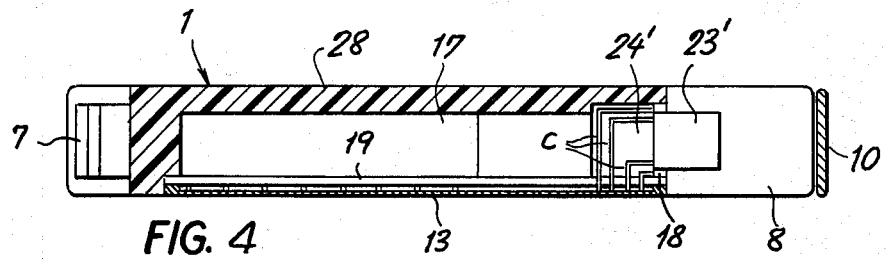
FIG. 4 is a cross-sectional view taken from above on the line IV—IV of FIG. 1.
Figure 5:
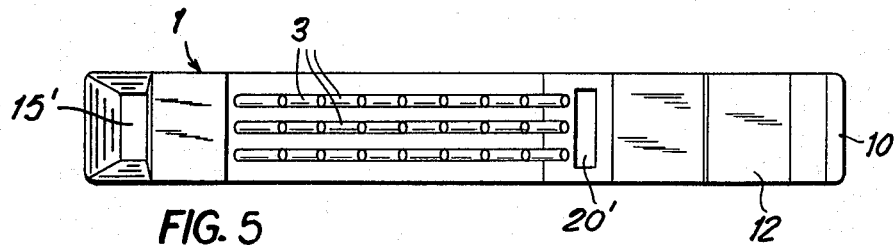
FIG. 5 is a top view of the unit shown in FIG. 1.

The modular connector unit shown in the drawing comprises a generally prismatic housing 1 (preferably of resinous material) forming an upper and a lower compartment 16, 17 (FIG. 3) supported by a common wall 28 (FIG. 4). The major housing surface opposite wall 28 is the outer face of a printed-circuit board 19 overlain by a cover 13 which is removably clipped thereto.

Along the larger sides of its rectangular outline, housing 1 is formed with a pair of recesses 2', 2" accommodating respective banks of terminals 3 and 4 in the shape of slanting pins. The recesses 2' and 2" are normally closed by removable lids 9', 9" clipped onto the housing by being resiliently fitted into undercuts 29', 29" and slots 20', 20". On the side opposite wall 28, however, the recesses are open even with covers 9', 9" and 13 in place.

On one of the minor housing surfaces, i.e. at left as seen in FIG. 1 and FIGS. 3–5, I provide means for removably clipping the connector unit to a supporting bar 5 carried on a switching frame partly indicated at 14. The upper edge of bar 5 fits into a groove defined by an overhanging lip 6 while its lower edge is engaged by a spring clip 7 secured to a ledge of the housing. It will be apparent that a number of identical modular units can be clipped alongside one another onto the same bar 5.

On the opposite minor surface, I provide a junction box 8 having lugs 23', 23" which slidably fit into pockets 22', 22" of housing 1. Bosses 24', 24" of box 8 have threaded bores 25', 25" to receive nonillustrated screws by which they are attached to housing wall 28, this wall being provided for that purpose with holes (not shown) aligned with bores 25', 25". Bosses 24' and 24" are integral with a block 18, bracketed by lugs 23', 23", which is frictionally or otherwise retained in the box 8 and can be extracted therefrom to enable the replacement of that box by a different one. Hinged to housing 1 at 11 is a door 10 which has a tongue 12 resiliently snapping into a groove at the top of the box when the door is closed; when it is swung open as shown in FIG. 6, access is had to two rows of contact elements 21a, 21f respectively connected to terminals 3 and 4 in a manner about to be described.

Passages 15' and 15" on the attachment side of housing 1, as best seen in FIG. 2, communicate with recesses 2' and 2" to facilitate the insertion of bundles of incoming lines a and outgoing lines f (only two of each shown) into these recesses where their extremities are tied to associated terminals 3 and 4, respectively. Each terminal 3 is connected to a lead b which extends downwardly into compartment 16 of housing 1 and then laterally outwardly, perpendicularly to the major housing surfaces, into the printed-circuit board 19 as seen in FIG. 3. In an analogous manner, terminals 4 are connected to respective leads e which pass upwardly into housing compartment 17 and then extend transversely into printed-circuit board 19. In the present instance, in which there are 24 input terminals 3 and as many output terminals 4, the ends of leads b and e are arrayed in an upper zone B and a lower zone E, respectively, of board 19. Conductor strips g and h of the printed circuit extend from these zones to two further zones C and D shown at right in FIG. 3, zone C carrying projecting ends of leads c tied to contact elements (e.g. plugs or jacks) 21a while zone D carries projecting ends of leads d tied to contact elements 21f. Leads c and d, accordingly, angularly pass into box 8 through insert 18, as best seen in FIG. 4. Thus, an electrically continuous path extends from each incoming line a via a terminal 3, a lead b, a strip g and a lead c to a respective contact element 21a on insert 18; similarly, an electrically continuous path extends from any contact element 21f on that insert by way of a lead d, a strip h, a lead e and a terminal 4 to a respective outgoing line f.

Figure 6:
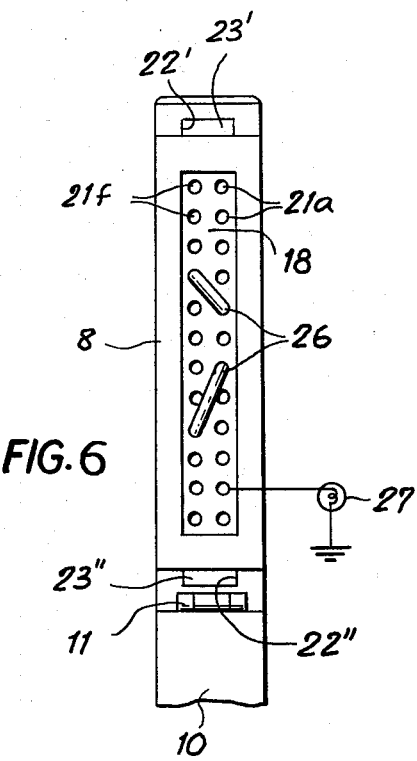
FIG. 6 is an end view taken from the side opposite that of FIG. 2.
Figure 7:
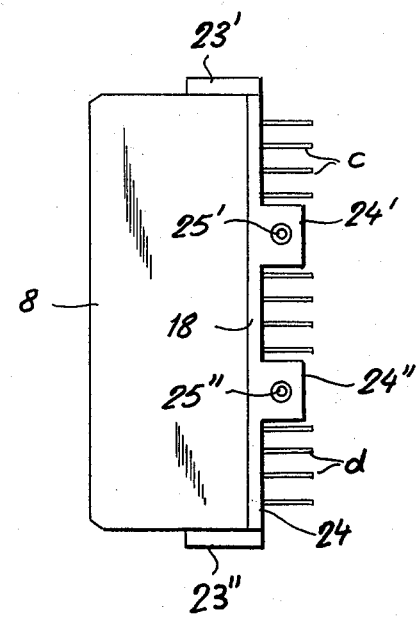
FIG. 7 is a side-elevational view of a junction box forming a part of a unit, the box being reversed with reference to its position in FIGS. 1 and 3.

As diagrammatically indicated in FIG. 6, any input-side contact element 21a can be connected to any output-side contact element 21f by a jumper 26. FIG. 6 also shows the possibility of establishing a circuit to any line via the corresponding contact element in series with a testing device diagrammatically represented as a lamp 27.

Door 10 can carry a nonillustrated label containing information about the electrical connections to be established within junction box 8.

Obviously, the internal connections within junction box 8 between leads c, d and contact elements 21a, 21f can be modified, with different groupings of these elements and possible omission of some of them.

I claim:

1. A modular connector for selectively interlinking incoming and outgoing lines of a communication system, comprising:
   a generally prismatic housing with two major surfaces interconnected by a first, a second and a third minor surface;
   a bank of input terminals extending from said housing at said first minor surface;
   a bank of output terminals extending from said housing at said second minor surface;
   a junction box secured to said housing at said third minor surface;
   a first set of leads extending within said housing from said input terminals and emerging in a first zone of one major surface thereof;
   a second set of leads extending within said housing from said output terminals and emerging in a second zone of said one major surface;
   a third set of leads extending within said housing from a third zone of said one major surface to said third minor surface and forming terminations in said junction box;
   a fourth set of leads extending within said housing from a fourth zone of said one major surface to said third minor surface and forming terminations in said junction box selectively connectable by linking elements to the terminations of said third set of leads; and
   conductor means on said one major surface extending from said first and second zones to said third and fourth zones for connecting the leads of said first set to respective leads of said third set and the leads of said second set to respective leads of said fourth set.

2. A modular connector as defined in claim 1 wherein said conductor means is part of a printed-circuit board forming said one major surface.

3. A modular connector as defined in claim 1 wherein said housing is of generally rectangular outline, said first and second minor surfaces extending along the larger sides of the rectangle.

4. A modular connector as defined in claim 3 wherein said housing is provided at a smaller side of the rectangle, opposite said third minor surface, with fastening means for clipping the housing onto a supporting frame member.

5. A modular connector as defined in claim 3 wherein said housing is provided with recesses along its larger sides, said input and output terminals being respectively received in said recesses.

6. A modular connector as defined in claim 5 wherein said housing is provided with passages generally parallel to said larger sides extending from said recesses to a side opposite said third minor surface, said passages being traversed by bundles of incoming and outgoing lines respectively tied to said input and output terminals.

7. A modular connector as defined in claim 5, further comprising removable lids for said recesses clipped onto said housing along said larger sides.

8. A modular connector as defined in claim 3 wherein said housing is provided with two compartments adjacent said larger sides respectively containing said first and second sets of leads.

9. A modular connector as defined in claim 1, further comprising cover means removably overlying said conductor means.

10. A modular connector as defined in claim 1 wherein said junction box is provided with a hinged door.

11. A modular connector as defined in claim 1 wherein said junction box and said housing are provided with interfitting formations detachably mounting said junction box on said housing.

12. A modular connector for selectively interlinking incoming and outgoing lines of a communication system, comprising:
   a generally prismatic housing of generally rectangular outline with two major surfaces interconnected by a first, a second and a third minor surface, said first and second minor surfaces extending along the larger sides of the rectangle;

a bank of input terminals extending from said housing at said first minor surface;

a bank of output terminals extending from said housing at said second minor surface;

a first set of leads extending within said housing from said input terminals and emerging in a first zone of one major surface thereof;

a second set of leads extending within said housing from said output terminals and emerging in a second zone of said one major surface;

a third set of leads extending within said housing from a third zone of said one major surface to said third minor surface;

a fourth set of leads extending within said housing from a fourth zone of said one major surface to said third minor surface for selective connection by linking elements to said third set of leads;

conductor means on said one major surface extending from said first and second zones to said third and fourth zones for connecting the leads of said first set to respective leads of said third set and the leads of said second set to respective leads of said fourth set; and fastening means on said housing at a smaller side of the rectangle, opposite said third minor surface, for clipping the housing onto a supporting frame member.

13. A modular connector for selectively interlinking incoming and outgoing lines of a communication system, comprising:

a generally prismatic housing of generally rectangular outline with two major surfaces interconnected by a first, a second and a third minor surface, said first and second minor surfaces extending along the larger sides of the rectangle;

a bank of input terminals disposed in a recess along said first minor surface;

a bank of output terminals disposed in a recess along said second minor surface, said housing being provided with passages generally parallel to said larger sides extending from said recesses to a side opposite said third minor surface, said passages being traversed by bundles of incoming and outgoing lines respectively tied to said input and output terminals;

a first set of leads extending within said housing from said input terminals and emerging in a first zone of one major surface thereof;

a second set of leads extending within said housing from said output terminals and emerging in a second zone of said one major surface;

a third set of leads extending within said housing from a third zone of said one major surface to said third minor surface;

a fourth set of leads extending within said housing from a fourth zone of said one major surface to said third minor surface for selective connection by linking elements to said third set of leads; and conductor means on said one major surface extending from said first and second zones to said third and fourth zones for connecting the leads of said first set to respective leads of said third set and the leads of said second set to respective leads of said fourth set.

14. A modular connector for selectively interlinking incoming and outgoing lines of a communication system, comprising:

a generally prismatic housing of generally rectangular outline with two major surfaces interconnected by a first, a second and a third minor surface, said first and second minor surfaces extending along the larger sides of the rectangle;

a bank of input terminals disposed in a recess along said first minor surface;

a bank of output terminals disposed in a recess along said second minor surface;

a first set of leads extending within said housing from said input terminals and emerging in a first zone of one major surface thereof;

a second set of leads extending within said housing from said output terminals and emerging in a second zone of said one major surface;

a third set of leads extending within said housing from a third zone of said one major surface to said third minor surface;

a fourth set of leads extending within said housing from a fourth zone of said one major surface to said third minor surface for selective connection by linking elements to said third set of leads;

conductor means on said one major surface extending from said first and second zones to said third and fourth zones for connecting the leads of said first set to respective leads of said third set and the leads of said second set to respective leads of said fourth set; and removable lids for said recesses clipped onto said housing along said larger sides.

* * * * *